US009918170B2

(12) United States Patent
Yliaho

(10) Patent No.: US 9,918,170 B2
(45) Date of Patent: Mar. 13, 2018

(54) HEARING-AID COMPATIBLE DISPLAY APPARATUS

(71) Applicant: Nokia Technologies Oy, Espoo (FI)

(72) Inventor: Marko Tapani Yliaho, Tampere (FI)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 14/324,721

(22) Filed: Jul. 7, 2014

(65) Prior Publication Data

US 2015/0078598 A1   Mar. 19, 2015

(30) Foreign Application Priority Data

Jul. 9, 2013 (GB) .................................. 1312309.6

(51) Int. Cl.
*H04R 25/00* (2006.01)
*H04M 1/725* (2006.01)

(52) U.S. Cl.
CPC ...... *H04R 25/554* (2013.01); *H04M 1/72591* (2013.01); *H04R 25/30* (2013.01); *H04R 2499/11* (2013.01)

(58) Field of Classification Search
CPC ...... H04R 25/43; H04R 25/55; H04R 25/554; H04R 25/30; H04R 2499/11; H04R 2499/15; H04M 1/72591; H04M 1/2474; H04M 1/2475; H04M 3/42391
USPC .................................................. 381/312–331
See application file for complete search history.

(56) References Cited

U.S. PATENT DOCUMENTS

| | | | |
|---|---|---|---|
| 5,524,275 | A | 6/1996 | Lindell |
| 7,356,153 | B2 | 4/2008 | Blumenau |
| 2002/0106995 | A1 | 8/2002 | Callaway, Jr. |
| 2004/0121799 | A1 | 6/2004 | Chiou |
| 2006/0084395 | A1 | 4/2006 | Kezys et al. |
| 2008/0056519 | A1 | 3/2008 | Jung et al. |
| 2009/0076816 | A1 | 3/2009 | Bradford et al. |
| 2009/0096683 | A1 | 4/2009 | Rosenblatt et al. |
| 2009/0284438 | A1 | 11/2009 | Matsunaga et al. |
| 2009/0295648 | A1 | 12/2009 | Dorsey et al. |
| 2010/0203862 | A1 | 8/2010 | Friedlander et al. |
| 2011/0075872 | A1 | 3/2011 | Frerking |
| 2011/0117973 | A1 | 5/2011 | Asrani et al. |
| 2012/0051570 | A1 | 3/2012 | Arche |

(Continued)

FOREIGN PATENT DOCUMENTS

| | | |
|---|---|---|
| CN | 101018247 A | 8/2007 |
| CN | 201740821 U | 2/2011 |

(Continued)

OTHER PUBLICATIONS

"Sprint Printable User Guide", Duramax, 136 pages.

(Continued)

*Primary Examiner* — Matthew Eason
*Assistant Examiner* — Sabrina Diaz
(74) *Attorney, Agent, or Firm* — Alston & Bird LLP

(57) ABSTRACT

An apparatus comprising: at least one element generator configured to determine at least one hearing aid display element; at least one element locator configured to determine a location of the at least one hearing aid display element based on a location of at least one hearing aid compatible coil; and a display configured to display the at least one hearing aid compatible display element based on the location determined.

16 Claims, 9 Drawing Sheets

(56) References Cited

U.S. PATENT DOCUMENTS

| | | | | |
|---|---|---|---|---|
| 2012/0208458 A1* | 8/2012 | Iwasaki | ................... | H04B 5/00 455/41.1 |
| 2012/0309310 A1 | 12/2012 | Greuet | | |
| 2012/0321115 A1 | 12/2012 | Jylanki | | |
| 2013/0034254 A1 | 2/2013 | Frerking et al. | | |
| 2013/0223631 A1* | 8/2013 | Greuet | ................... | H04R 1/403 381/17 |
| 2013/0281014 A1* | 10/2013 | Frankland | ............. | H04W 4/008 455/41.1 |
| 2014/0357321 A1 | 12/2014 | Yliaho et al. | | |

FOREIGN PATENT DOCUMENTS

| | | |
|---|---|---|
| GB | 2 476 675 A | 7/2011 |
| WO | 2012/063103 A1 | 5/2012 |
| WO | 2012109610 A1 | 8/2012 |
| WO | 2013/093567 A1 | 6/2013 |

OTHER PUBLICATIONS

U.S. Appl. No. 13/905,695, "Panel Speaker Ear Location", filed May 30, 2013, 40 pages.

Extended European Search Report received for corresponding European Patent Application No. 14175509.0, dated Sep. 30, 2014, 5 pages.

GB Search Report received for priority Application No. GB1312309.6 dated Dec. 13, 2013, 4 pages.

Pinto, Y. et al., *Numerical Mobile phone models validated by SAR measurements*, EuCAP 2011—Convened Papers, (2011) 2585-2588.

Nishikido, T. et al., *Multi-Antenna System for a Handy Phone to Reduce Influence by User's Hand*, Wireless Communication Technology, IEEE Topical Conference (2003) 348-351.

Office Action for European Patent Application No. EP 14175509.0 dated Feb. 14, 2017, 5 pages.

Communication Under Rule 71(3) of Intention to Grant a Patent for European Patent Application No. 14175509.0, dated Oct. 20, 2017, 42 pages.

* cited by examiner

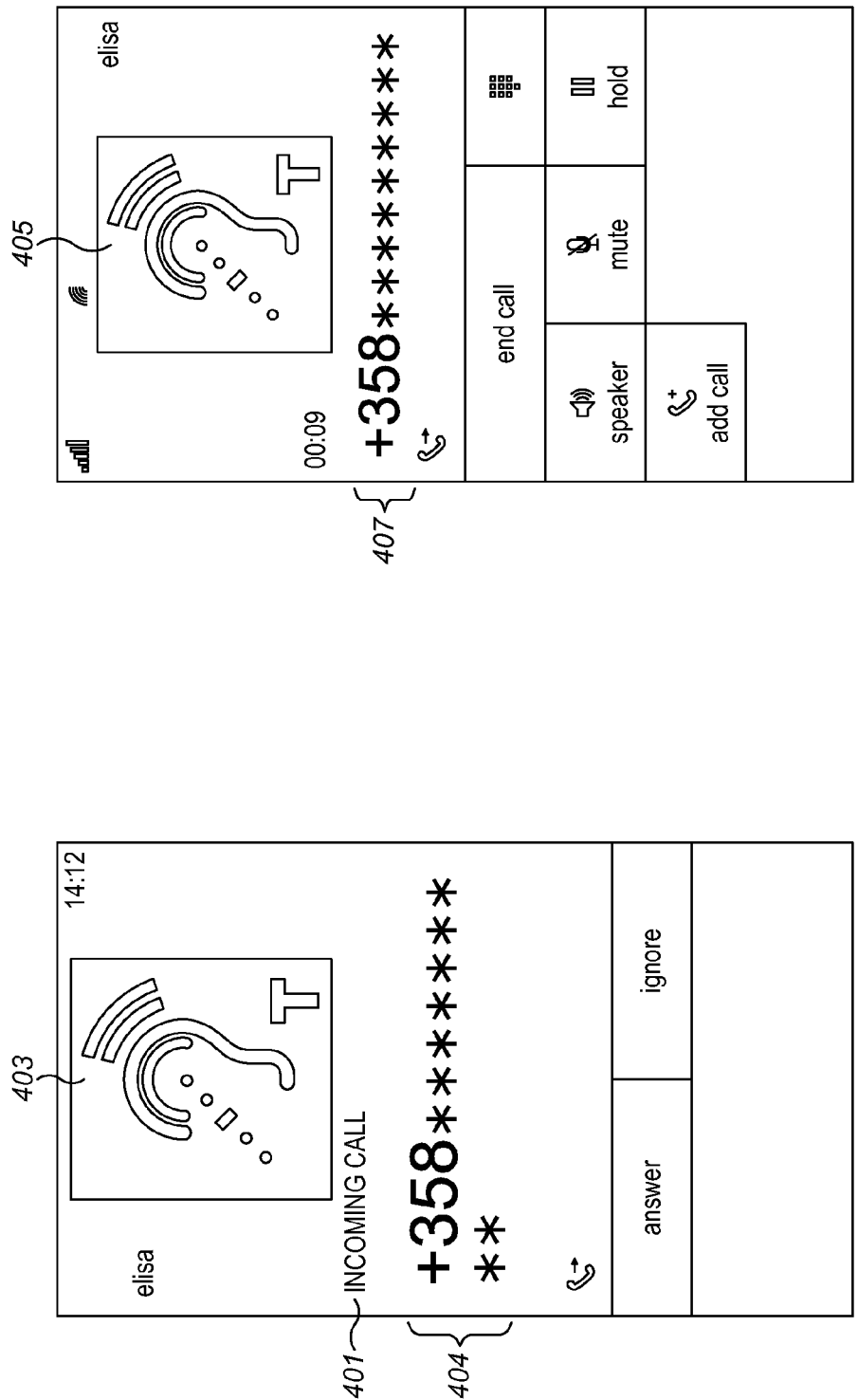

HEARING-AID COMPATIBLE DISPLAY APPARATUS

FIELD

The present invention relates to a display apparatus providing visual indication for hearing aid coil location functionality. The invention further relates to, but is not limited to, display apparatus providing visual indication for hearing aid coil location functionality for use in mobile devices.

BACKGROUND

Many portable devices, for example mobile telephones, are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the operating mode of the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

Hearing Aid Compatibility (HAC) is to a certain level a mandatory feature at least in devices sold in North America. HAC enabled devices feature a coil located in the device configured to enable magnetic induction to transmit an audio signal to a hearing aid device in the user's ear. Typically the coil of an earpiece is used also as a HAC coil or the HAC coil is a discrete and separate coil.

STATEMENT

According to an aspect, there is provided a method comprising: determining at least one hearing aid display element; determining for an apparatus a location of the at least one hearing aid display element based on a location of at least one hearing aid compatible coil; and displaying the at least one hearing aid compatible display element based on the location determined.

The method may further comprise determining the orientation of the apparatus comprising the at least one hearing aid compatible coil.

Determining for the apparatus a location of the at least one hearing aid display element based on a location of at least one hearing aid compatible coil may be further based on the orientation of the apparatus.

The at least one hearing aid display element may comprise at least one of: at least one hearing aid visual element; and at least one hearing aid tactile element.

The at least one hearing aid visual element may comprise at least one of: at least one hearing aid icon; at least one area and/or region with an associated pattern indicating a hearing aid reception area; at least one area and/or region with an associated image indicating a hearing aid reception area; at least one area and/or region with an associated colour indicating a hearing aid reception area; and at least one first area and/or region with a first associated colour and at least one second area and/or region with a second associated colour, the at least one first area and/or region indicating a better reception than the at least one second area and/or region.

Determining for the apparatus a location of the at least one hearing aid display element based on a location of at least one hearing aid compatible coil comprises: determining the at least one hearing aid display element is a fixed element, wherein the location of the at least one hearing aid display element is independent of the orientation of the orientation of the display.

The method may further comprise: determining a neighbouring hearing aid location relative to the hearing aid compatible coil; and wherein determining at least one hearing aid display element may comprise determining the at least one hearing aid display element based on the neighbouring hearing aid location relative to the hearing air compatible coil.

The at least one hearing aid display element based on the neighbouring hearing aid location relative to the hearing aid compatible coil may be an indicator that the hearing aid is outside of an acceptable reception region relative to the hearing aid compatible coil.

Determining a neighbouring hearing aid location relative to the hearing aid compatible coil may comprise detecting an ear shaped region neighbouring a display.

The method may further comprise: determining at least two hearing aid compatible coils; determining the location of one of the at least two hearing aid compatible coils, wherein determining for the display the location of the at least one hearing aid display element may be based on the location of the one of the at least two hearing aid compatible coils.

Determining for the apparatus a location of the at least one hearing aid display element based on a location of at least one hearing aid compatible coil may comprise at least one of: determining for the apparatus a location of the at least one hearing aid display element further based on the at least one hearing aid compatible coil being activated; and determining for the apparatus a location of the at least one hearing aid display element further based on the at least one hearing aid compatible coil being disabled.

The method may further comprise receiving at least one user input to activate the at least one hearing aid compatible coil.

Determining at least one hearing aid display element may comprise at least one of: generating the at least one hearing aid display element; retrieving the at least one hearing aid display element as a pre-determined at least one hearing aid display element from a memory; and receiving the at least one hearing aid display element as a pre-determined at least one hearing aid display element from an apparatus.

Displaying the at least one hearing aid compatible display element based on the location determined may comprise marking at the location determined on the apparatus with at least one of: at least one indentation indicating the location of the at least one hearing aid compatible display element; at least one raised area indicating the location of the at least one hearing aid compatible display element; at least one depression indicating the location of the at least one hearing aid compatible display element; and at least one dimple indicating the location of the at least one hearing aid compatible display element.

According to a second aspect there is provided an apparatus comprising: means for determining at least one hearing aid display element; means for determining a location of the at least one hearing aid display element based on a location of at least one hearing aid compatible coil; and means for displaying the at least one hearing aid compatible display element based on the location determined.

The apparatus may further comprise means for determining the orientation of the apparatus comprising the at least one hearing aid compatible coil.

The means for determining for the apparatus a location of the at least one hearing aid display element based on a location of at least one hearing aid compatible coil may comprise means for determining for the apparatus a location of the at least one hearing aid display element further based on the orientation of the apparatus.

The at least one hearing aid display element may comprise at least one of: at least one hearing aid visual element; and at least one hearing aid tactile element.

The at least one hearing aid visual element may comprise at least one of: at least one hearing aid icon; at least one area and/or region with an associated pattern indicating a hearing aid reception area; at least one area and/or region with an associated image indicating a hearing aid reception area; at least one area and/or region with an associated colour indicating a hearing aid reception area; and at least one first area and/or region with a first associated colour and at least one second area and/or region with a second associated colour, the at least one first area and/or region indicating a better reception than the at least one second area and/or region.

The means for determining for the apparatus a location of the at least one hearing aid display element based on a location of at least one hearing aid compatible coil may comprise: means for determining the at least one hearing aid display element is a fixed element, wherein the location of the at least one hearing aid display element is independent of the orientation of the orientation of the display.

The apparatus may further comprise: means for determining a neighbouring hearing aid location relative to the hearing aid compatible coil; and wherein the means for determining at least one hearing aid display element may comprise means for determining the at least one hearing aid display element based on the neighbouring hearing aid location relative to the hearing air compatible coil.

The at least one hearing aid display element based on the neighbouring hearing aid location relative to the hearing aid compatible coil may be an indicator that the hearing aid is outside of an acceptable reception region relative to the hearing aid compatible coil.

The means for determining a neighbouring hearing aid location relative to the hearing aid compatible coil may comprise means for detecting an ear shaped region neighbouring a display.

The apparatus may further comprise: means for determining at least two hearing aid compatible coils; means for determining the location of one of the at least two hearing aid compatible coils, wherein the means for determining for the display the location of the at least one hearing aid display element is based on the location of the one of the at least two hearing aid compatible coils.

The means for determining for the apparatus a location of the at least one hearing aid display element based on a location of at least one hearing aid compatible coil may comprise at least one of: means for determining for the apparatus a location of the at least one hearing aid display element further based on the at least one hearing aid compatible coil being activated; and means for determining for the apparatus a location of the at least one hearing aid display element further based on the at least one hearing aid compatible coil being disabled.

The apparatus may further comprise means for receiving at least one user input to activate the at least one hearing aid compatible coil.

The means for determining at least one hearing aid display element may comprise at least one of: means for generating the at least one hearing aid display element; means for retrieving the at least one hearing aid display element as a pre-determined at least one hearing aid display element from a memory; and means for receiving the at least one hearing aid display element as a pre-determined at least one hearing aid display element from an apparatus.

The means for displaying the at least one hearing aid compatible display element based on the location determined may comprise means for marking at the location determined on the apparatus with at least one of: at least one indentation indicating the location of the at least one hearing aid compatible display element; at least one raised area indicating the location of the at least one hearing aid compatible display element; at least one depression indicating the location of the at least one hearing aid compatible display element; and at least one dimple indicating the location of the at least one hearing aid compatible display element.

According to a third aspect there is provided an apparatus comprising at least one processor and at least one memory including computer program code for one or more programs, the at least one memory and the computer program code configured to, with the at least one processor, cause the apparatus at least to: determine at least one hearing aid display element; determine a location of the at least one hearing aid display element based on a location of at least one hearing aid compatible coil; and display the at least one hearing aid compatible display element based on the location determined.

The apparatus may further be caused to determine the orientation of the apparatus comprising the at least one hearing aid compatible coil.

Determining for the apparatus a location of the at least one hearing aid display element based on a location of at least one hearing aid compatible coil may cause the apparatus to determine the location of the at least one hearing aid display element further based on the orientation of the apparatus.

The at least one hearing aid display element may comprise at least one of: at least one hearing aid visual element; and at least one hearing aid tactile element.

The at least one hearing aid visual element may comprise at least one of: at least one hearing aid icon; at least one area and/or region with an associated pattern indicating a hearing aid reception area; at least one area and/or region with an associated image indicating a hearing aid reception area; at least one area and/or region with an associated colour indicating a hearing aid reception area; and at least one first area and/or region with a first associated colour and at least one second area and/or region with a second associated colour, the at least one first area and/or region indicating a better reception than the at least one second area and/or region.

Determining a location of the at least one hearing aid display element based on a location of at least one hearing aid compatible coil may cause the apparatus to: determine the at least one hearing aid display element is a fixed element, wherein the location of the at least one hearing aid display element is independent of the orientation of the orientation of the display.

The apparatus may further be caused to: determine a neighbouring hearing aid location relative to the hearing aid compatible coil; and wherein determining at least one hearing aid display element may cause the apparatus to determine the at least one hearing aid display element based on the neighbouring hearing aid location relative to the hearing air compatible coil.

The at least one hearing aid display element based on the neighbouring hearing aid location relative to the hearing aid compatible coil may be an indicator that the hearing aid is outside of an acceptable reception region relative to the hearing aid compatible coil.

Determining a neighbouring hearing aid location relative to the hearing aid compatible coil may cause the apparatus to detect an ear shaped region neighbouring a display.

The apparatus may further be causes to: determine at least two hearing aid compatible coils; determine the location of one of the at least two hearing aid compatible coils, wherein the determining for the display the location of the at least one hearing aid display element may be based on the location of the one of the at least two hearing aid compatible coils.

Determining for the apparatus a location of the at least one hearing aid display element based on a location of at least one hearing aid compatible coil may cause the apparatus to determine at least one of: a location of the at least one hearing aid display element further based on the at least one hearing aid compatible coil being activated; a location of the at least one hearing aid display element further based on the at least one hearing aid compatible coil being disabled.

The apparatus may further be caused to receive at least one user input to activate the at least one hearing aid compatible coil.

Determining at least one hearing aid display element may cause the apparatus to perform at least one of: generate the at least one hearing aid display element; retrieve the at least one hearing aid display element as a pre-determined at least one hearing aid display element from a memory; and receive the at least one hearing aid display element as a pre-determined at least one hearing aid display element from an apparatus.

Displaying the at least one hearing aid compatible display element based on the location determined may cause the apparatus to be marked at the location determined on the apparatus with at least one of: at least one indentation indicating the location of the at least one hearing aid compatible display element; at least one raised area indicating the location of the at least one hearing aid compatible display element; at least one depression indicating the location of the at least one hearing aid compatible display element; and at least one dimple indicating the location of the at least one hearing aid compatible display element.

According to a fourth aspect there is provided an apparatus comprising: at least one element generator configured to determine at least one hearing aid display element; at least one element locator configured to determine a location of the at least one hearing aid display element based on a location of at least one hearing aid compatible coil; and a display configured to display the at least one hearing aid compatible display element based on the location determined.

The apparatus may further comprise an orientation sensor configured to determine the orientation of the apparatus comprising the at least one hearing aid compatible coil.

The at least one element locator may be configured to determine the location of the at least one hearing aid display element further based on the orientation of the apparatus.

The at least one hearing aid display element may comprise at least one of: at least one hearing aid visual element; and at least one hearing aid tactile element.

The at least one hearing aid visual element may comprise at least one of: at least one hearing aid icon; at least one area and/or region with an associated pattern indicating a hearing aid reception area; at least one area and/or region with an associated image indicating a hearing aid reception area; at least one area and/or region with an associated colour indicating a hearing aid reception area; and at least one first area and/or region with a first associated colour and at least one second area and/or region with a second associated colour, the at least one first area and/or region indicating a better reception than the at least one second area and/or region.

The at least one element locator may be configured to: determine the at least one hearing aid display element is a fixed element, wherein the location of the at least one hearing aid display element is independent of the orientation of the orientation of the display.

The apparatus may further comprise: a hearing aid determiner configured to determine a neighbouring hearing aid location relative to the hearing aid compatible coil; and wherein the at least one element locator may be configured to determine the at least one hearing aid display element based on the neighbouring hearing aid location relative to the hearing air compatible coil.

The at least one hearing aid display element based on the neighbouring hearing aid location relative to the hearing aid compatible coil may be an indicator that the hearing aid is outside of an acceptable reception region relative to the hearing aid compatible coil.

The hearing aid determiner may be configured to detect an ear shaped region neighbouring a display.

The apparatus may further comprise: a multiple coil determiner configured to determine at least two hearing aid compatible coils; a multiple coil location determiner configured to determine the location of one of the at least two hearing aid compatible coils, wherein the at least one element locator may be configured to determine the location of the at least one hearing aid display element based on the location of the one of the at least two hearing aid compatible coils.

The at least one element locator may be configured to determine at least one of: a location of the at least one hearing aid display element further based on the at least one hearing aid compatible coil being activated; and a location of the at least one hearing aid display element further based on the at least one hearing aid compatible coil being disabled.

The apparatus may further comprise at least one user input configured to generate at least one user input to activate the at least one hearing aid compatible coil.

The at least one element generator may be configured to generate the at least one hearing aid display element.

The at least one element generator may be configured to retrieve the at least one hearing aid display element as a pre-determined at least one hearing aid display element from a memory The at least one element generator may be configured to receive the at least one hearing aid display element as a pre-determined at least one hearing aid display element from an apparatus.

The display may comprise a mark at the location determined on the apparatus, the mark may be at least one of: at least one indentation indicating the location of the at least one hearing aid compatible display element; at least one raised area indicating the location of the at least one hearing aid compatible display element; at least one depression indicating the location of the at least one hearing aid compatible display element; and at least one dimple indicating the location of the at least one hearing aid compatible display element.

The display may be the cover of the apparatus.

According to a fifth aspect there is provided an apparatus comprising: at least one processor; at least one memory; at least one transceiver; at least one hearing aid compatible coil; at least one element generator configured to determine at least one hearing aid display element; at least one element locator configured to determine a location of the at least one hearing aid display element based on a location of at least one hearing aid compatible coil; and at least one display/casing part configured to display the at least one hearing aid compatible display element based on the location determined.

A computer program product stored on a medium for causing an apparatus to may perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which:

FIGS. 5a to 5c show further example apparatus configuration displays according to some embodiments;

DESCRIPTION OF EXAMPLE EMBODIMENTS

The application describes apparatus and methods of controlling user interface elements with regards to displaying hearing aid compatible visual information.

In HAC compatible devices there is typically employed an earpiece coil or a discrete coil in order to provide HAC functionality.

However the location of a coil may not be clear, for example in the in the case where the device does not have a conventional earpiece, and as such the operation of the device may be problematic in HAC mode.

The concept according to the embodiments as described herein is to provide a visual indication using the device user interface, for example during a phone call, showing or indicating the location of the area where HAC can be used.

In some embodiments this indication can be visible only if the HAC feature in the first place has been enabled in the device's settings.

Furthermore in some embodiments the provision of a visual indication can be implemented instead or in addition to the UI indication by a physical or tactile indication on the front window such as physical mark or bump indicating the location of the HAC coil.

Figure 1:
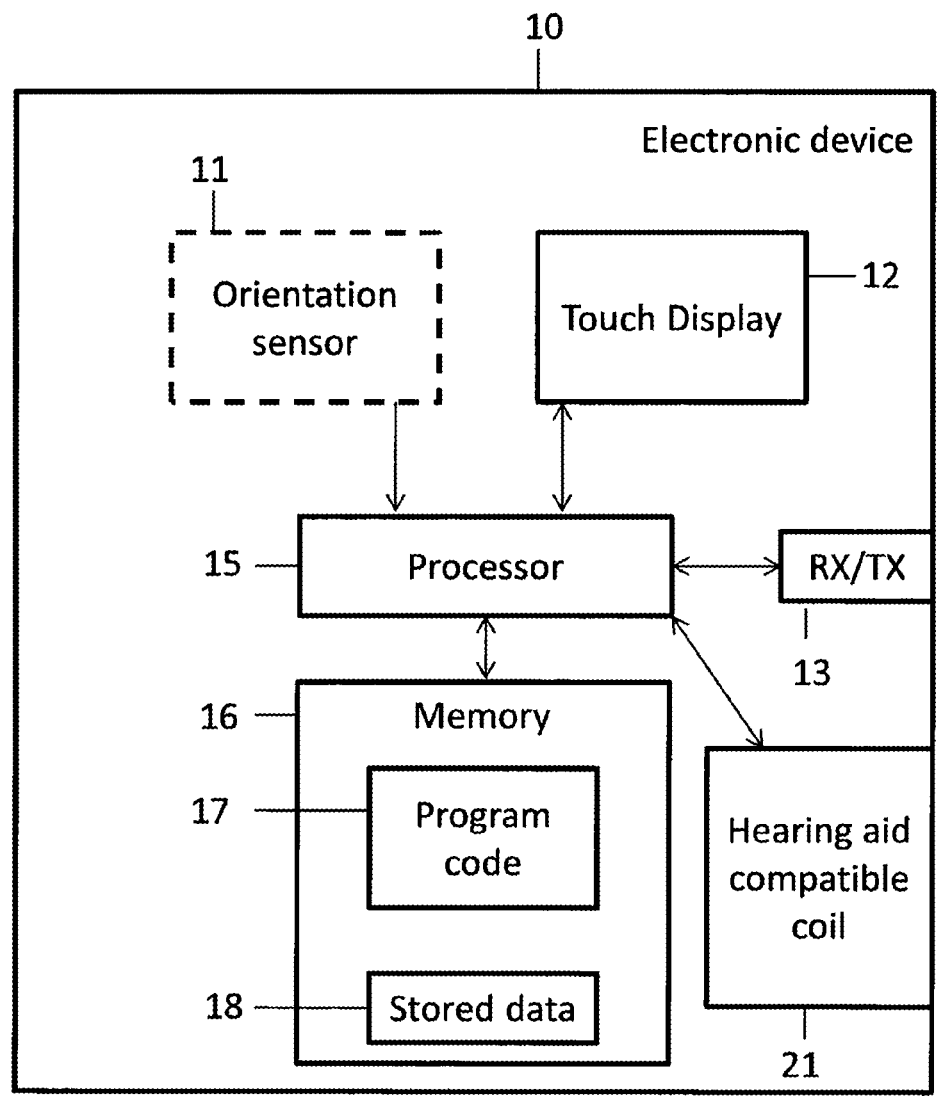
FIG. 1 shows schematically an apparatus suitable for employing some embodiments.

With respect to FIG. 1 a schematic block diagram of an example electronic device 10 or apparatus on which some embodiments can be implemented. The apparatus 10 is such embodiments configured to provide improved visual information for hearing aid compatible enabled apparatus.

The apparatus 10 is in some embodiments a mobile terminal, mobile phone or user equipment for operation in a wireless communication system. In other embodiments, the electronic device is any suitable electronic device configured to provide a image display, such as for example a digital camera, a portable audio player (mp3 player), a portable video player (mp4 player). In other embodiments the apparatus can be any suitable electronic device with a display interface.

The apparatus 10 comprises a touch display module 12. The touch display module in some embodiments includes an input module or user input interface, which is linked to a processor 15. In some embodiments the touch display module further includes a display, suitable for displaying to the user images which is also coupled to the processor. In some embodiments the touch display module 12 further includes an acoustic display module suitable for generating the acoustic waves required by the apparatus (for example to simulate the earpiece or integrated hands free transducer). It would be understood that in some embodiments the touch display module can be configured to determine not only a physical touch but also hovering touch where the finger or touching part is close to but not in physical contact with the module.

The processor 15 is further linked to a transceiver (TX/RX) 13 and to a memory 16.

In some embodiments, the touch display module 12 is separate or separable from the electronic device and the processor receives signals from the touch input module 11 and/or transmits and signals to the display 12 via the transceiver 13 or another suitable interface.

The processor 15 can in some embodiments be configured to execute various program codes. The implemented program codes, in some embodiments can comprise such routines as user interface control and configuration code, and touch capture code where the touch input module inputs are detected and processed, display image processing and image interaction code where the data to be passed to generate the display images is generated for example based on the detection of the orientation of the apparatus, or actuator processing generating an actuator signal for driving an actuator. The implemented program codes can in some embodiments be stored for example in the memory 16 and specifically within a program code section 17 of the memory 16 for retrieval by the processor 15 whenever needed. The memory 16 in some embodiments can further provide a section 18 for storing data, for example data that has been processed in accordance with the application, for example display information data.

The touch display module 12 can in some embodiments implement any suitable touch screen interface technology. For example in some embodiments the touch screen interface can comprise a capacitive sensor configured to be sensitive to the presence of a finger above or on the touch screen interface. In some other embodiments the touch input module can be a resistive sensor. In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition.

The touch display module 12 may comprise any suitable display technology. For example the display element can be located below the touch input module and project an image through the touch input module to be viewed by the user. The touch display module 12 can employ any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 employs one of the display technologies projected using a light guide to the display window.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other electronic devices, for example in some embodiments via a wireless communication network.

In some embodiments, the apparatus comprises an orientation sensor 11. The orientation sensor 11 can be any suitable orientation sensor. The orientation sensor can in some embodiments be part of a position sensor configured to estimate the position of the apparatus. The position sensor can in some embodiments be a satellite positioning sensor such as GPS (Global Positioning System), GLONASS or Galileo receiver.

In some embodiments, the positioning sensor can be a cellular ID system or assisted GPS system.

In some embodiments, the orientation sensor can be any suitable orientation sensor. For example, in some embodiments the orientation sensor can be an electronic compass, an accelerometer, a gyroscope or be determined by the motion of the apparatus using the positioning estimate (in other words, dead reckoning).

In some embodiments the apparatus comprises a discrete hearing aid compatible (HAC) coil 21. The HAC coil is a conductive coil suitable for generating a magnetic induction field which is received by a hearing aid. As described herein in some embodiments the location of the hearing aid compatible coil 21 can be any suitable location but is typically located within the device.

Figure 2:
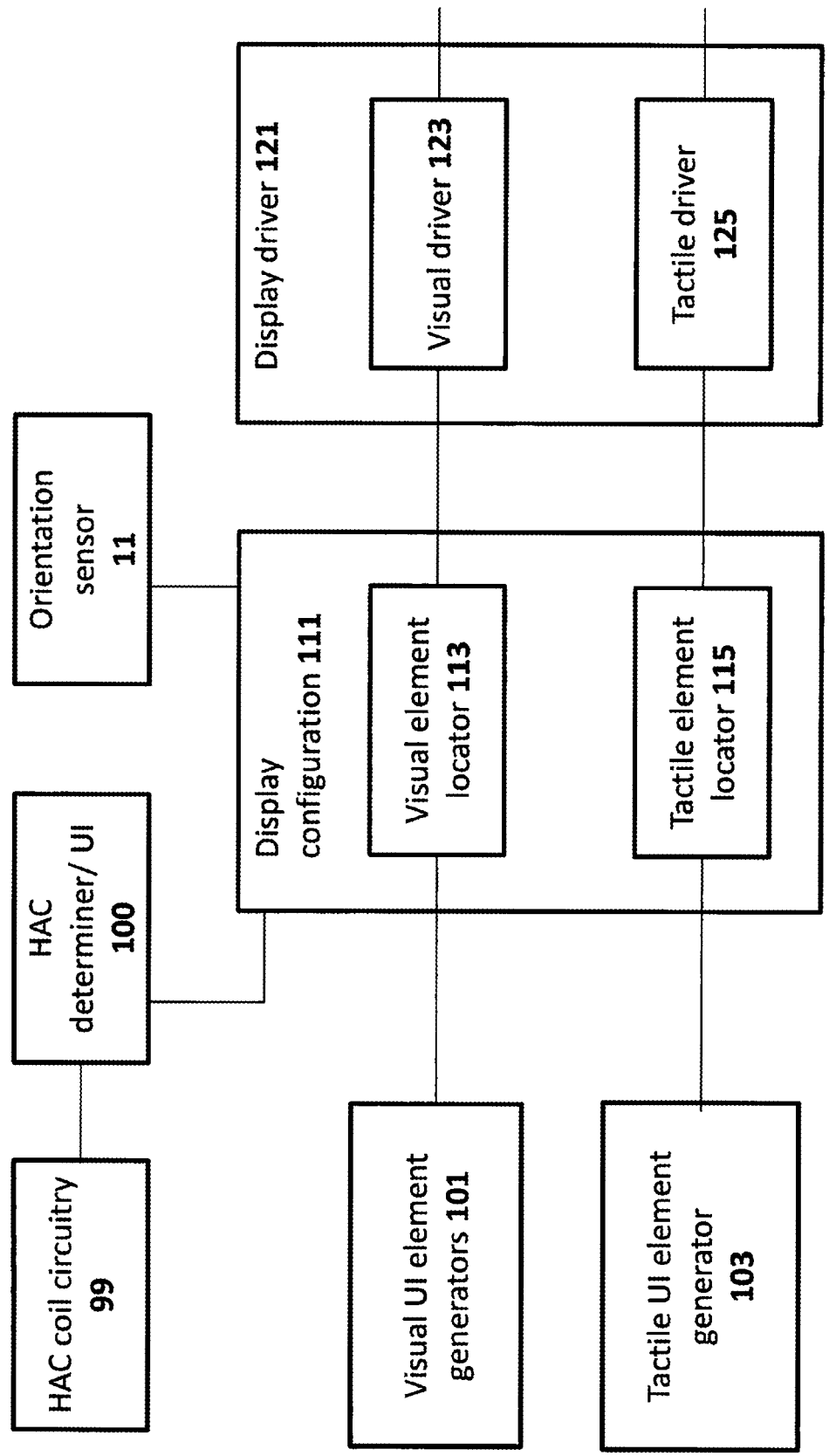
FIG. 2 shows schematically a user interface control apparatus according to some embodiments.

With respect to FIG. 2, an example user interface control apparatus according to some embodiments is shown. With respect to FIG. 3 a flow diagram showing the operation of the user interface control apparatus is shown.

In some embodiments the user interface control apparatus comprises hearing aid compatible (HAC) coil circuitry 99. The HAC coil circuitry 99 can in some embodiments be configured to drive or power the HAC coil 21. In some embodiments the HAC coil circuitry 99 can be coupled to a HAC determiner/UI.

In some embodiments the user interface control apparatus comprises a HAC determiner/user interface 100. The HAC determiner/user interface 100 in some embodiments is configured to control the HAC coil circuitry and thus the HAC coil. Furthermore in some embodiments the HAC determiner/user interface 100 can be configured to determine whether the HAC coil circuitry is active, in other words whether the HAC coil is generating a magnetic field. Thus for example in some embodiments the HAC determiner/user interface 100 is configured to determine whether the HAC coil circuitry and thus the HAC coil is enabled, in other words whether the apparatus is operating in a HAC mode.

Figure 3:
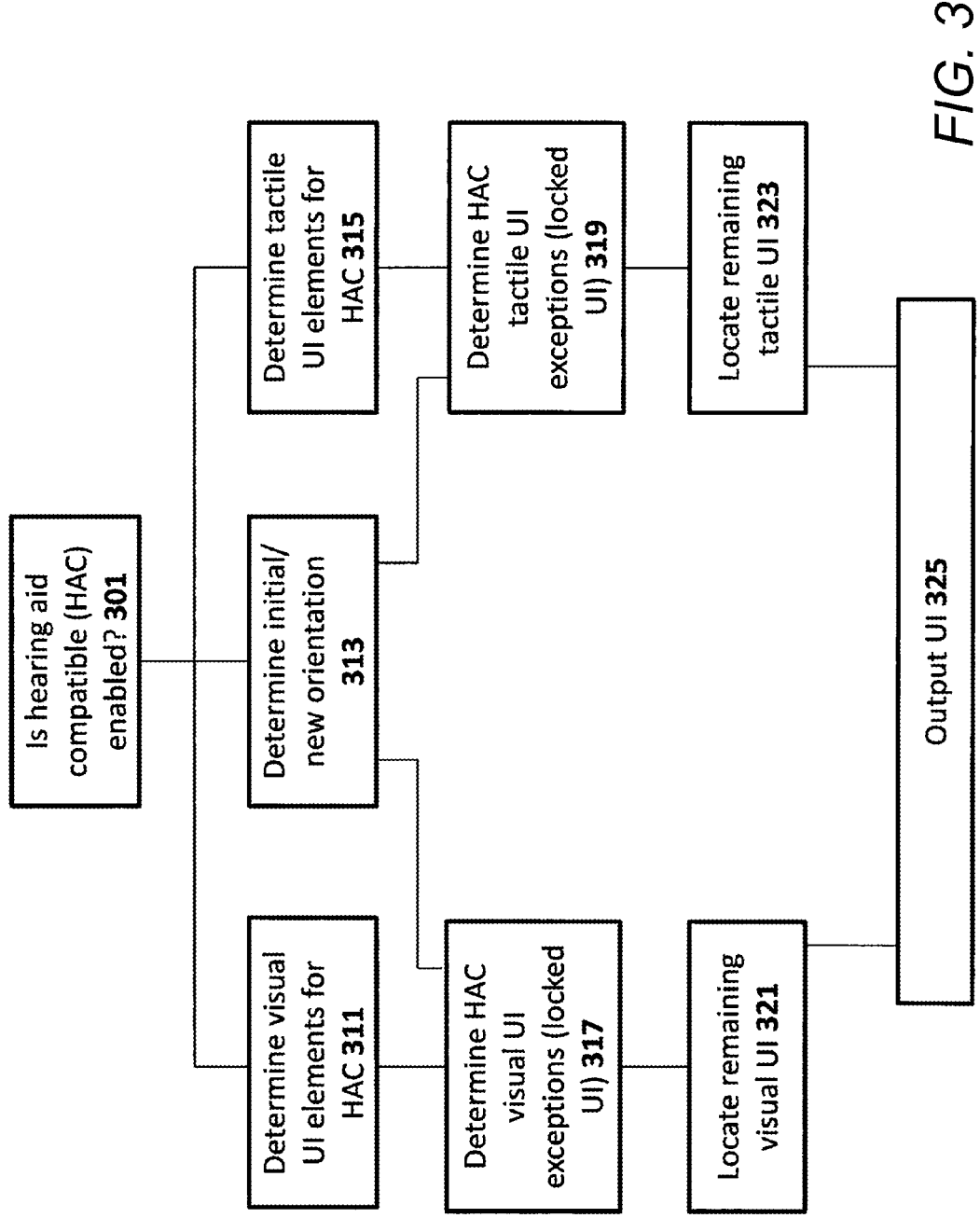
FIG. 3 shows a flow-diagram of the operation of the user interface control apparatus as shown in FIG. 2 according to some embodiments.

The operation of determining whether the HAC mode is enabled is shown in FIG. 3 by step 301.

Where the HAC mode is enabled then the following apparatus is configured to perform the following operations. However where the HAC mode is not enabled then the operation can be caused to wait until the HAC mode is enabled.

In some embodiments, the user interface control apparatus comprises a visual user interface element generator 101. The visual user interface element generator 101 in some embodiments is configured to determine which elements are required for the visual part of the user interface for the HAC enabled mode.

An example of a visual element is a 'virtual location indicator' or location indicator. An example of a location indicator is an image displayed by the visual display to indicate to a user where the location of the HAC coil so that the user orientates the device correctly in order to use the device. As well as the HAC based visual elements it would be understood that other visual elements, for example virtual button or keys can be determined in some embodiments these other visual elements might be flexibly positioned on the display, in other words be located on the display independent on the display or apparatus orientation.

The visual user interface element generator can be configured to output the element requirements to a display configurator 111 and in some embodiments to a visual element locator 113.

The operation of determining the visual user interface elements is shown in FIG. 3 by step 311.

In some embodiments, the user interface control apparatus comprises a tactile user interface element generator. The tactile user interface element generator 103 can in some embodiments be configured to determine where any user interface tactile elements with respect to the HAC mode are to be displayed. For example, in an apparatus where the user tactile interface elements are located behind the display, or part of the display such as in a flat panel display with tactile flat panel generating capacity the touch display module can be configured to generate a tactile output from a specific area of the display to indicate a virtual position. The tactile user interface element generator can for example determine the position of the HAC coil and where the HAC mode is enabled and a tactile effect required at the position generate any parameters associated with the tactile effect element to be generated.

The tactile user interface element generator 103 can be configured in some embodiments to output the determined elements to the display configurator 111 and specifically in some embodiments to a tactile element locator 115.

The operation determining the tactile user interface elements is shown in FIG. 3 by step 315.

The orientation sensor 11 can furthermore be configured to monitor and output an indication of the orientation of the apparatus. In some embodiments this indication can be an indication of which section of the touch display module 12 is located highest or an up orientation indication whereas in some embodiments the orientation indication can be with respect to determining a northerly or other compass direction.

The output of the orientation sensor 11 can be passed to the display configurator 111.

The operation of determining an initial or new orientation of the apparatus is shown in FIG. 3 by step 313.

In some embodiments, the user interface control apparatus comprises a display configurator 111. The display configurator 111 in some embodiments is configured to receive the visual element(s) and tactile element(s) together with any parameters determined with them such as positioning on the display. The display configurator 111 furthermore in some embodiment receives the orientation of the apparatus information from the orientation sensor 11. The display configured in some embodiments to determine the actual location/rotation on the touch display 12 for the visual element(s) and tactile element(s).

In some embodiments the display configurator 111 comprises a visual element locator 113 configured to receive the visual elements (such as HAC location indicator, virtual buttons, virtual earpiece display, message display, and background display images) and based on the orientation information determine the location of the visual location elements on the display.

In some embodiments, the visual element locator 113 initially determines whether or not any of the visual elements have associated with them an orientation exception, in other words whether the component is fixed or floating. A fixed element is one which has a fixed location on the display, whereas a floating element is one which is dependent on the orientation of the apparatus.

Where the visual element is a fixed component then any conditions associated with the fixing are examined to determine whether the element in this circumstance is to be fixed. For example, where there are three virtual button visual elements which are defined as being located at the 'bottom' surface or edge of the display, there may be an associated indication that when the apparatus is operating as a mobile phone and is actively making or receiving a call then the virtual buttons are to be fixed so that the user 'knows' where the buttons are when the apparatus is held against the head. Similarly the HAC location indication can be fixed in that it has a fixed location defined by the location of the HAC coil.

Where the visual element locator 113 determines the visual element is fixed the visual element locator can then 'locate' the visual element dependent on the original requested location of the visual element received from the visual user interface element generator 101. In the virtual button example discussed herein when the apparatus is being used for a telephone call or located against the head then the visual element locator 113 determines that the current location of the virtual buttons is to be maintained. Similarly in the example of the HAC location indicator the visual element locator 113 determines the visual element is fixed and 'locates' the visual element.

The operation of determining the visual user interface exceptions (locked or fixed visual elements) is shown in FIG. 3 by step 317.

The visual element locator 113 can then be configured to locate the remaining visual elements dependent on the orientation sensor information. Thus for example in some embodiments the HAC location indicator can comprise a text field which is not fixed but can rotate dependent on the orientation indication.

The visual element locator 113 can output the visual user interface element and the location of the visual elements to the display driver 121 and specifically in some embodiments a visual driver 123.

The locating of the remaining visual user interface elements is shown in FIG. 3 by step 321.

In some embodiments, the display configurator 111 comprises a tactile element locator 115. The tactile element locator 115 can be configured in some embodiments to receive the tactile elements and based on the orientation information determine the location of the tactile location elements on the display.

In some embodiments, the tactile element locator 115 initially determines whether or not any of the tactile element have associated with them an orientation exception, in other words whether the element is fixed or floating. This in a similar manner with respect to the provision of a tactile HAC location effect can be fixed based on the location of the HAC coil. However it would be understood that in some embodiments the tactile HAC location effect may be used to determine whether the current location of the user is not optimally positioned relative to the HAC coil. In such embodiments in order to generate a suitable directional tactile HAC location effect the directional tactile effect (move apparatus up/down/left/right) can be floating.

Where the tactile element can be a fixed element then any conditions associated with the fixing are examined to determine whether the element in this circumstance is to be fixed. For example tactile HAC location elements which are defined as being located at the 'top' surface or edge of the display is to be fixed as the location of the HAC coil is fixed with respect to the display.

Where the tactile element locator 115 determines the tactile element is fixed the tactile element locator can then 'locate' the tactile element dependent on the original requested location of the tactile element received from the tactile user interface element generator 103. In the tactile HAC location example discussed herein when the apparatus is being used for a telephone call or located against the head then the tactile element locator 115 determines that the current location of the HAC coil is to be maintained.

The operation of determining the tactile user interface exceptions (locked or fixed visual elements) is shown in FIG. 3 by step 319.

The tactile element locator 115 can then be configured to locate the remaining tactile elements dependent on the orientation sensor information.

For example the directional tactile HAC location example discussed herein, the tactile element locator 115 can be configured to change the location of the directional tactile HAC location effect based on the orientation information such that the 'move apparatus up' effect is always towards the top of the display whichever way the apparatus is being held.

The location of the remaining tactile user interface elements is shown in FIG. 3 by step 323.

The tactile element locator 115 can in some embodiments output this information to the display driver 121 and specifically in some embodiments, the tactile driver 125.

In some embodiments, the apparatus comprises a display driver 121. The display driver 121 is configured to receive the visual and tactile element locations and output a suitable signal to the display to provide these at the locations requested.

The display driver in some embodiments, comprises a visual driver 123 configured to receive the visual elements of the user interface and the locations of the visual user interface elements and output a signal to the display such that the display is able to output visual representations of the required form and orientation and location.

Similarly in some embodiments, the display driver can comprise a tactile driver 125 configured to output the tactile user interface elements at the requested location.

The operation of outputting the user interface elements is shown in FIG. 3 by step 325.

In some embodiments the visual and/or tactile elements can be configured to indicate where the visual and/or tactile element is required to perform any of the following options: rotate with the device (in other words maintain a continuous floating display), to be fixed to at a number of orientations (this would typically be four possible orientations—up, down, left and right), rotate with the device to a subset of the number (four) of possible orientations (for example only both the portrait orientations but not the landscape orientations or vice versa).

In some embodiments the rules defining the visual elements and the tactile elements can differ. For example a phone call application user interface may define with respect to the tactile UI element generator 103 a tactile HAC location effect to a specific piezo actuator and therefore fix the tactile element to this location independent of the orientation wherein the visual elements can be moved dependent on the orientation. Thus for example text associated with the visual HAC location effect can be permitted to rotate with the apparatus.

With respect to FIGS. 4a to 4e example visual and tactile location elements are shown that are associated with the HAC mode of operation.

Figure 4C:
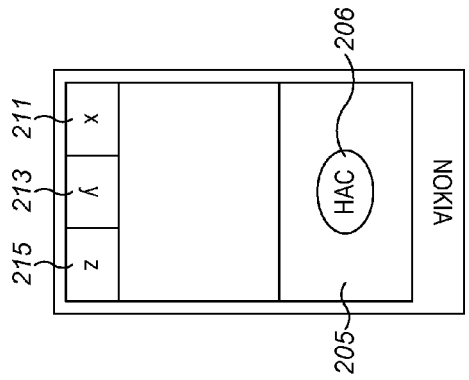
FIGS. 4a to 4e show example apparatus configuration displays according to some embodiments.
Figure 4E:
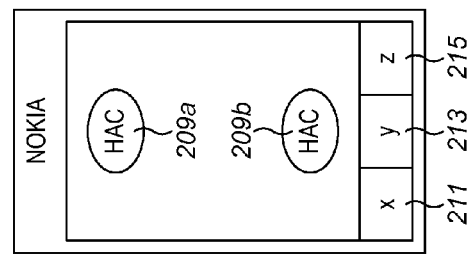
Figure 4B:
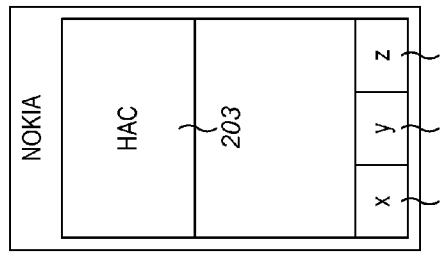
Figure 4D:
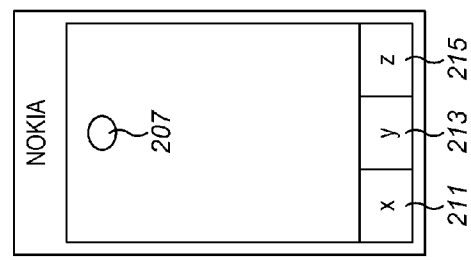
Figure 4A:
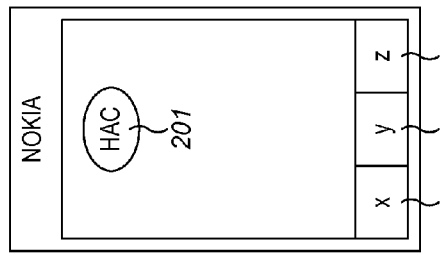

For example FIG. 4a shows an example visual HAC location indicator 201 on a generated user interface for a display. The HAC location indicator 201 is as described herein located fixed relative to the display and as such is independent on the rotation of the apparatus. Also shown in FIG. 4a (and also shown in FIGS. 4b to 4e) are virtual buttons 211, 213 and 215.

It would be understood that the visual HAC location indicator or HAC visual element can be any suitable shape, size or colour.

For example as shown in FIG. 4b a further visual HAC location indicator 203 is shown. The further visual HAC location indicator 203 is shown having a different shape (being a rectangle rather than oval) and having a larger area than the HAC location indicator 201 shown in FIG. 4a. In such an example the different HAC location indicators can be used to show different strengths of signal areas. For example in some embodiments the visual HAC location indicator 201 shown in FIG. 4a can show a good signal HAC mode location and the further visual HAC location indicator 203 as shown in FIG. 4b shows an acceptable signal HAC mode location. In other words in some embodiments the visual HAC location indicator 203 is a hearing aid reception area indicator, which provides a visual indication of where when placing a hearing aid in this area would permit the hearing aid reception level to be acceptable/good/optimal.

With respect to FIG. 4c a version of the further visual HAC location indicator 205 is shown. In this example the further visual HAC location indicator 205 is shown on a display having been rotated 180°. In this example the location of the further visual HAC location element is at the bottom part of the apparatus as the location or position of the further visual HAC location indicator is fixed (in other words located on the display irrespective of the orientation). In the example shown in FIG. 4c the further visual HAC location indicator 205 comprises a text field 206. The text field 206 can for example be a floating visual element. In other words be configured such that display of the text field is dependent on the orientation of the apparatus such that a change to the orientation of the device causes a similar change to the orientation of the text field 206. This floating text field 206 can for example improve the readability of the text. It would be understood that in some embodiments the text is fixed on the display rather than floating and as such there is no orientation change to the text field relative to the display orientation.

With respect to FIG. 4d a representation of an example tactile HAC location effect 207 is shown. In such embodiments a tactile effect can be generated at the location 207 indicating where the HAC coil is under the display. In some embodiments the tactile effect is permanent. In other words rather than generating a tactile effect by the use of the tactile transducers a physical mark is presented on the front window of the display.

With respect to FIG. 4e an example display showing more than one visual HAC location indicator. In this example the apparatus can comprise two HAC coils. A first coil located towards the uppermost side and having an associated visual HAC location indicator 209a and a second HAC coil located towards the bottom side and having an associated second HAC visual indicator 209b. In such embodiments the visual HAC location indicator can be orientation affected (in other words be effectively floating). In other words in some embodiments only the uppermost HAC indicator and HAC coil is active at any one time. In such embodiments the apparatus is configured to be operable in both a upwards and downwards orientation.

Figure 5C:
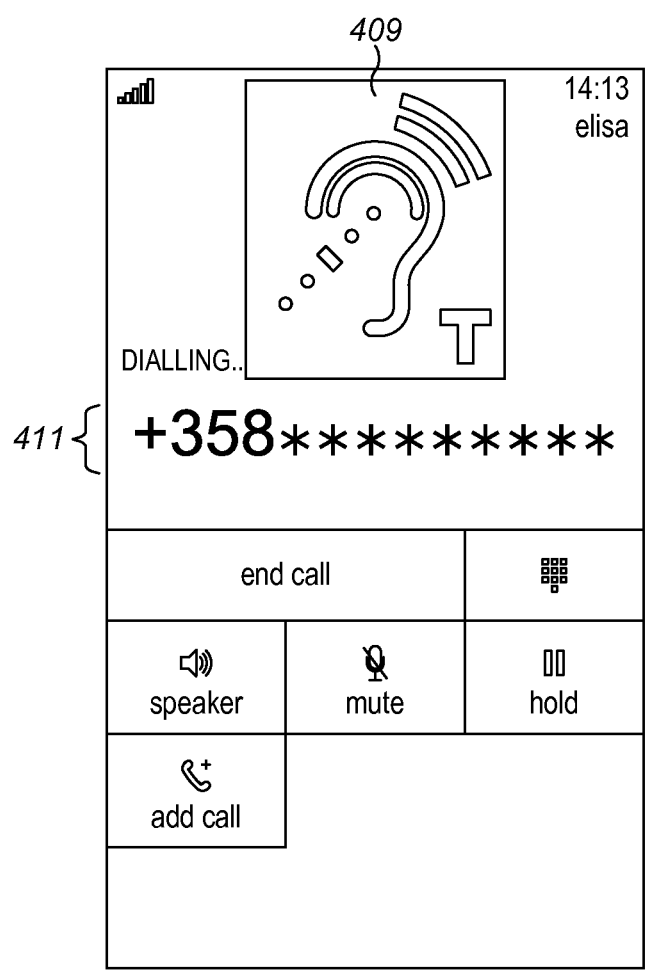

With respect to FIGS. 5a to 5c further example images showing visual HAC location indications are shown. With respect to FIG. 5a an example image is shown for an incoming call user interface 401 with a visual HAC location indicator 403 and incoming call phone number 404 and virtual buttons.

Furthermore with respect to FIG. 5b an example image is shown for an in-call user interface with the visual HAC location indication 405 on a user interface and call number 407 and virtual buttons.

Furthermore FIG. 5c shows an example image of dialing user interface with the visual HAC location indicator 409 with a dialing number 411 and virtual buttons.

Figure 6:
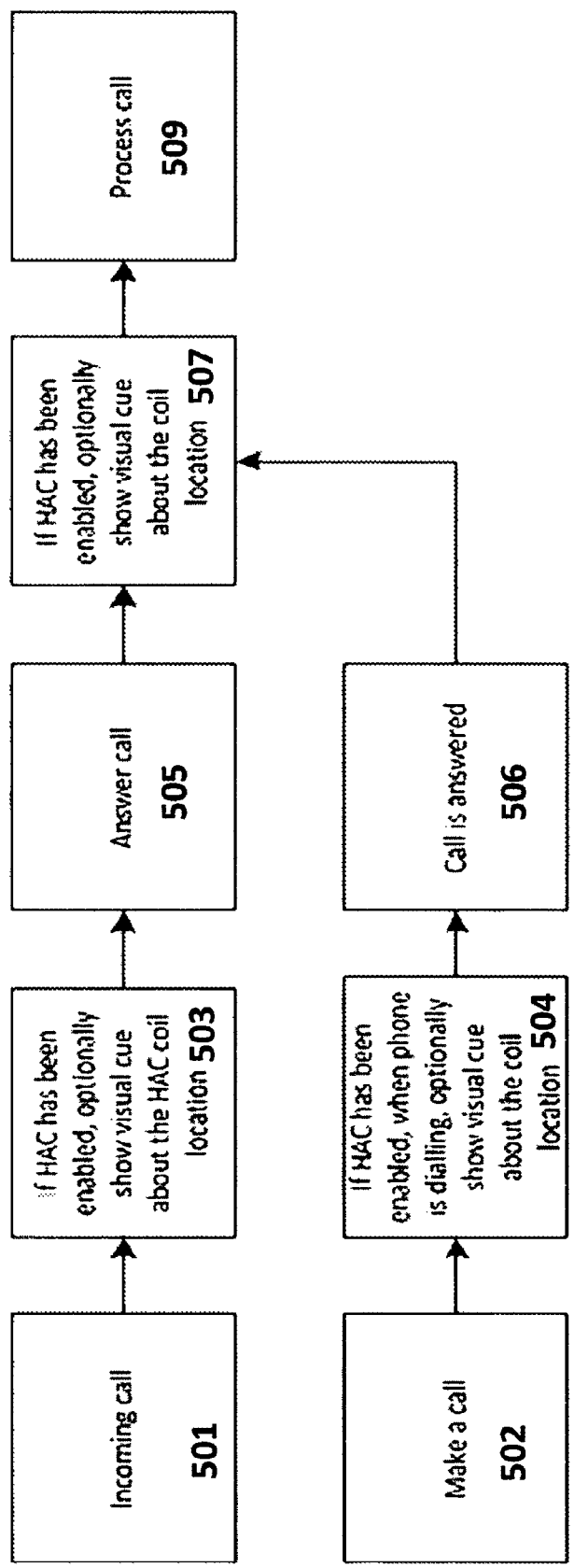
FIG. 6 shows a flow-diagram of the operation of the user interface control apparatus for answering and making a call according to some embodiments.

With respect to FIG. 6 an example flowchart of a mobile device operation according to HAC operations is shown.

For example in some embodiments an incoming call can be received at the mobile device.

The operation of receiving an incoming call is shown in FIG. 6 by step 501.

In some embodiments the HAC determiner and/or user interface can be configured to determine whether the HAC coil and circuitry (or mode) has been enabled. In some embodiments where the HAC determiner has indicated that the HAC mode is enabled then the display configurator can be configured to locate the visual cue or the visual location indicator within an incoming call user interface display output such as for example shown in FIG. 5a.

The operation of showing the visual location indicator within the incoming call user interface display output is shown in FIG. 6 by step 503.

In some embodiments the call can be answered, for example by use of the incoming call user interface display output virtual button.

The operation of answering the call is shown in FIG. 6 by step 505.

Once the call has been answered then in some embodiments, and based on the HAC determiner/user interface 100 determination of whether the HAC mode is enabled then the display configurator 111 and the element generators 101, 103 can be configured to generate and locate HAC location indicators can be displayed within an in-call user interface display output during the call such as shown in FIG. 5b.

The operation of showing a visual location indicator while the call is taken within the in-call user interface display is shown in FIG. 6 by step 507.

Furthermore the call can be processed.

The operation of processing the call is shown in FIG. 6 by step 509.

Furthermore FIG. 6 shows the operations related to making a call according to some embodiments.

The operation of making a call is shown in FIG. 6 by step 502.

The HAC determiner and/or user interface can be configured to determine whether the HAC coil and circuitry (or mode) has been enabled. In some embodiments where the HAC determiner has indicated that the HAC mode is enabled then the display configurator 111 and the element generators 101, 103 can be configured to generate and locate HAC location indicators showing the location of the coil within a dialing user interface display such as shown for example in FIG. 5C.

The operation of showing a visual location indicator while making the call or dialing the call is shown in FIG. 6 by step 504.

In some embodiments the call can be answered at the other end.

The operation of answering the call is shown in FIG. 6 by step 506.

Once the call has been answered then in some embodiments, and based on the HAC determiner/user interface 100 determination of whether the HAC mode is enabled then the display configurator 111 and the element generators 101, 103 can be configured to generate and locate HAC location indicators can be displayed within an in-call user interface display output during the call such as shown in FIG. 5b.

The operation of showing a visual location indicator while the call is taken within the in-call user interface display is shown in FIG. 6 by step 507.

Furthermore the call can be processed.

The operation of processing the call is shown in FIG. 6 by step 509.

Although the examples shown in FIG. 6 show the HAC location indicator as being a visual cue or visual location indicator it would be understood that a tactile effect or tactile HAC location indicator can be generated.

In the embodiments described above the location indication is primarily a static indicator, however in some embodiments the location indicator is controlled based on feedback such as provided by the touch screen or touch display 12 to determine the location of the ear on the display and enable the location indicator to 'guide' the user such that the HAC coil and the ear containing the hearing aid are optimally aligned or located to provide a better magnetic coupling between the HAC coil and the hearing aid.

In some such embodiments the feedback is continuous such that where the ear is detected to be in a good HAC performance area than a monitoring of the ear location relative to the display continues and where the location of the ear relative to the display indicates that the ear has moved from a good HAC performance area then a visual or haptic effect can be generated to indicate to the user that the motion has occurred and in some embodiments a direction to move to improve the performance.

Figure 7:
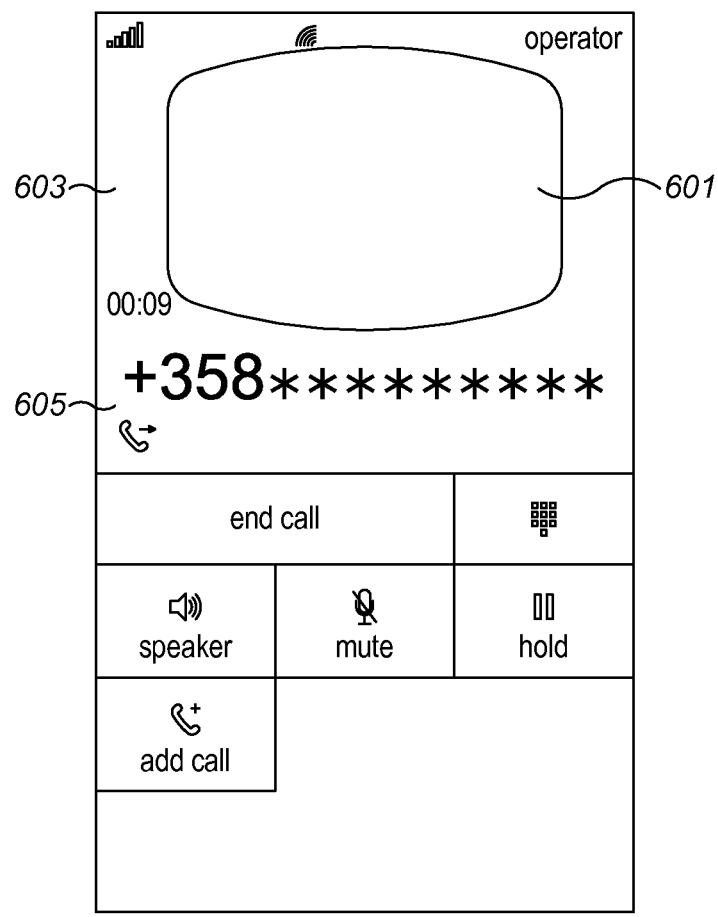
FIG. 7 shows an example apparatus configuration display for HAC location monitoring according to some embodiments.

An example visual representation is shown in FIG. 7 which shows an example in call user interface display over which are located a good HAC performance area indicator 601, an acceptable HAC performance area 603 surrounding the good HAC performance area and a poor HAC performance area 605 located away from the good HAC performance area.

As described herein in some embodiments a tactile effect (or in some embodiments an audio effect) can be generated to indicate to the user where the user of the apparatus has moved out of a good or acceptable HAC performance area and furthermore in some embodiments in which direction the apparatus is to be moved to improve the performance and 'realign' the HAC coil and hearing aid. As described herein this directional tactile HAC location effect is not fixed on the display but can be relative to the orientation of the apparatus.

Figure 8:
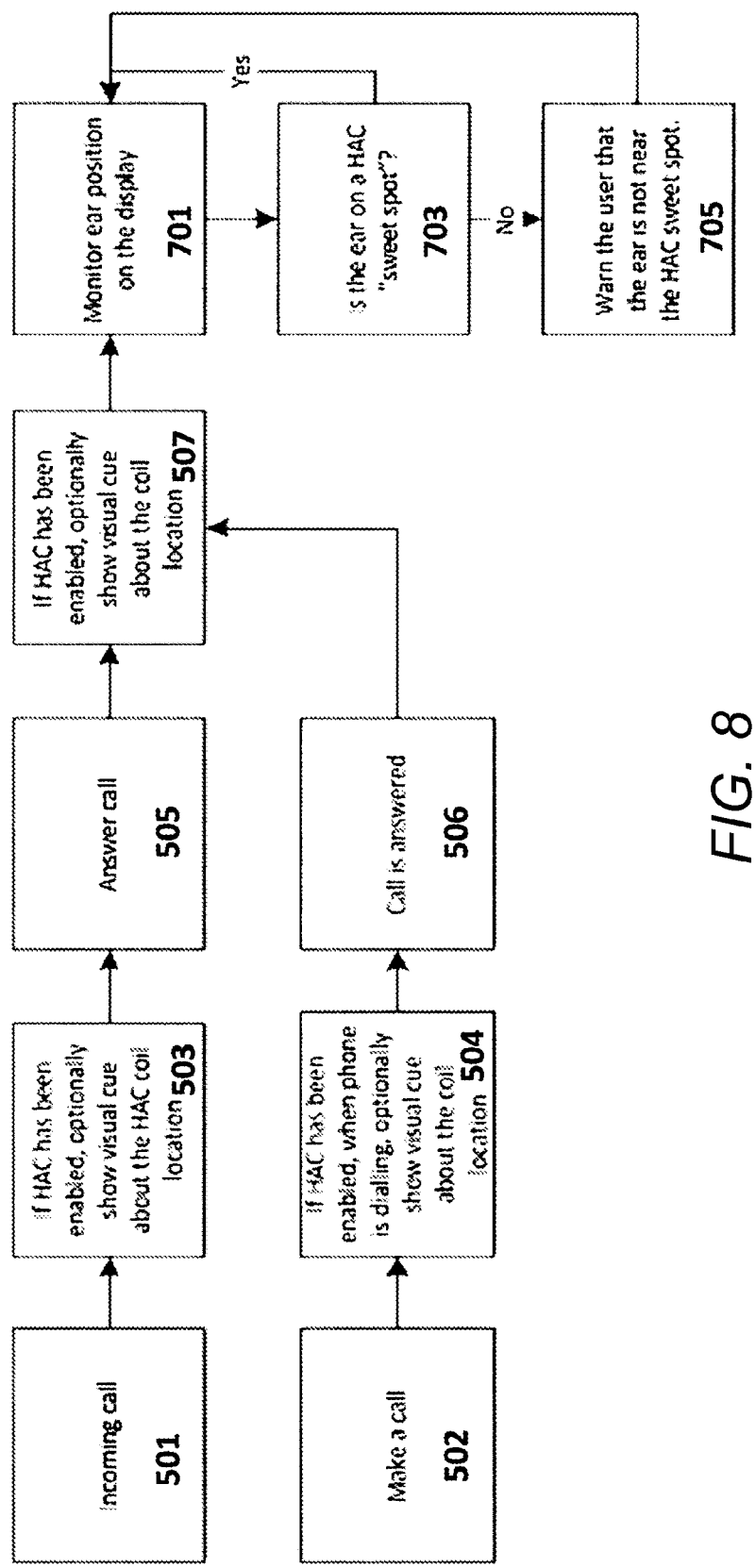
FIG. 8 shows a flow-diagram of the operation of the user interface control apparatus for answering and making a call and HAC location monitoring according to some embodiments.

With respect to FIG. 8 the example operation or making and receiving a call as shown in FIG. 6 is extended by the additional operations by monitoring the user location such that the processing of the call operation 509 is expanded to a monitoring the ear position on the display operation 701, a determination of whether the ear is located on a HAC sweet spot operation 703 (in other words operating in a good HAC performance area). Where the ear is located on the sweet spot then the operation returns to continually monitoring the operation (in other words loops back to step 701. Whereas where the ear is not located on the HAC sweet spot then the user is informed that the ear is not on the HAC sweet spot as shown in operation 705 and then returning to monitoring the position of the ear on the display again.

In some embodiments the HAC determiner/UI 100 is configured to determine whether the ear is located on a HAC sweet spot based on the output from the capacitive display. In other words the capacitive display or panel can be configured to generate an output signal which is used by the HAC determiner to detect where the ear is placed in the neighbourhood of the apparatus and furthermore in some embodiments the relative position of the ear to the HAC coil and therefore determine whether the ear is located within a HAC operating sweet spot.

In some embodiments the HAC feature can be switched on or off in other words enabled or disabled and therefore controlling the display either visually or tactile to generate suitable HAC based indicators.

The generation of a tactile effect and/or audio effect can be generated by the tactile driver 125. In some embodiments the tactile driver comprises at least one piezoelectric actuator. Thus for example the apparatus can in some embodiments employ a first piezoelectric actuator located towards one end of body of the apparatus and a second piezoelectric actuator located at the opposite end of the body of the apparatus. The piezoelectric actuator is in some embodiments coupled to receive power from a battery via a printed wiring board and to produce a physical moment or force in response to a current passed through the piezoelectric actuator.

Each piezoelectric actuator can in some embodiments be located within a case body configured to receive the piezoelectric actuator. The piezoelectric actuator can be in position such that when a current is applied the piezoelectric actuator flexes and can 'push' against the case body thus producing a motion in and away from the direction of the display. In other words where the display is considered to be in a plane designated the X-Y axis the actuations of the piezoelectric actuator to actuate or produce a force in a "Z" dimension or direction.

It would be understood that any suitable actuator capable of producing a translational force to a display could be implemented in some further embodiments to provide the tactile effect. For example in some other embodiments an eccentric mass can be employed to move the display be producing a force which may be passed to the display. In further examples a moving coil or moving magnet actuator can generate the force. In some further embodiments the display can directly experience the motion or force which is transmitted from the piezoelectric actuator to the display in such a manner to permit a planar motion of the display.

In some embodiments the display is suspended such that a motion of the display in a z direction substantially perpendicularly to the plane of the display image allowed.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
determining whether at least one hearing aid compatible coil of an apparatus is active;
providing for display of a visual indicator at a location on a display of the apparatus corresponding to the at least one hearing aid compatible coil based on a position of at least one hearing aid compatible coil in response to the hearing aid compatible coil being active;
determining an orientation of the apparatus;
providing for display of one or more visual elements, wherein a location and rotation of the one or more visual elements is determined based on the orientation of the apparatus;
wherein the location of the visual indicator corresponding to the at least one hearing aid compatible coil is maintained regardless of orientation of the apparatus;
monitoring a location of a hearing aid of a user relative to the at least one hearing aid compatible coil while the hearing aid compatible coil is active;
providing at least one of audible or tactile feedback in response to the hearing aid moving from a first position having a first quality of coupling between the hearing aid and the at least one hearing aid compatible coil to a second position having a second quality of coupling between the hearing aid and the at least one hearing aid compatible coil, wherein the second quality is relatively worse than the first quality;

determining whether a direction of relative movement, indicated by the at least one of an audible or tactile feedback, between the hearing aid compatible coil and the hearing aid improves a quality of coupling between the hearing aid and the at least one hearing aid compatible coil; and continuing to monitor the location of the hearing aid of the user relative to the at least one hearing aid compatible coil regardless of the direction of relative movement that is determined.

2. The method as claimed in claim 1, wherein the visual indicator comprises at least one of:

at least one hearing aid icon;

at least one area of the display with an associated pattern indicating a hearing aid reception area;

at least one area of the display with an associated image indicating a hearing aid reception area;

at least one area of the display with an associated colour indicating a hearing aid reception area; or at least one first area of the display with a first associated color and at least one second area of the display with a second associated color, the at least one first area indicating a better reception than the at least one second area.

3. The method as claimed in claim 1, further comprising:
determining a neighboring hearing aid location relative to the hearing aid compatible coil position; and wherein determining the one or more visual elements comprises determining the visual indicator based on the neighboring hearing aid location relative to the hearing aid compatible coil position.

4. The method as claimed in claim 3, wherein the visual indicator based on the neighboring hearing aid location relative to the hearing aid compatible coil position is an indicator for indicating that a hearing aid is outside of an acceptable reception region relative to the hearing aid compatible coil position.

5. The method as claims in claim 3, wherein determining the neighboring hearing aid location relative to the hearing aid compatible coil comprises detecting an ear shaped region neighbouring a display of the apparatus.

6. The method as claimed in claim 1, further comprising receiving at least one user input to activate the at least one hearing aid compatible coil.

7. The method of claim 1, wherein the visual indicator comprises at least one visual indicator element, wherein the visual indicator element rotates about the location on the display corresponding to the at least one hearing aid compatible coil, based on the orientation of the apparatus.

8. The method of claim 1, further comprising:
providing for a tactile indication presented at the location corresponding to the at least one hearing aid compatible coil.

9. An apparatus comprising at least one processor and at least one memory including computer program code for one or more programs, the at least one memory and the computer program code configured to, with the at least one processor, cause the apparatus at least to:

determine whether at least one hearing aid compatible coil of the apparatus is active;

provide for display of a visual indicator at a location on a display of the apparatus corresponding to the at least one hearing aid compatible coil based on a position of at least one hearing aid compatible coil in response to the hearing aid compatible coil being active;

determine an orientation of the apparatus;

provide for display of one or more visual elements, wherein a location and rotation of the one or more visual elements is determined based on the orientation of the apparatus;

wherein the location of the visual indicator corresponding to the at least one hearing aid compatible coil is maintained regardless of orientation of the apparatus;

monitor a location of a hearing aid of a user relative to the at least one hearing aid compatible coil while the hearing aid compatible coil is active;

provide at least one of audible or tactile feedback in response to the hearing aid moving from a first position having a first quality of coupling between the hearing aid and the at least one hearing aid compatible coil to a second position having a second quality of coupling between the hearing aid and the at least one hearing aid compatible coil, wherein the second quality is relatively worse than the first quality;

determine whether a direction of relative movement, indicated by the at least one of an audible or tactile feedback, between the hearing aid compatible coil and the hearing aid improves a quality of coupling between the hearing aid and the at least one hearing aid compatible coil; and continue to monitor the location of the hearing aid of the user relative to the at least one hearing aid compatible coil regardless of the direction of relative movement that is determined.

10. The apparatus as claimed in claim 9, wherein the apparatus is further caused to determine a neighboring hearing aid location relative to the hearing aid compatible coil position; and wherein the visual indicator is based on the neighboring hearing aid location relative to the hearing aid compatible coil position.

11. The apparatus as claimed in claim 10, wherein the visual indicator based on the determined neighbouring hearing aid location is an indicator to indicate that the hearing aid is outside of an acceptable reception region relative to the hearing aid compatible coil position.

12. The apparatus of claim 9, wherein the visual indicator comprises at least one visual indicator element, wherein the visual indicator element rotates about the location on the display corresponding to the at least one hearing aid compatible coil, based on the orientation of the apparatus.

13. The apparatus of claim 9, wherein the apparatus is further caused to:
provide for a tactile indication presented at the location corresponding to the at least one hearing aid compatible coil.

14. A computer program product comprising at least one non-transitory computer-readable storage medium having computer-executable program code instructions stored therein, the computer-executable program code instructions comprising program code instructions for:

determining whether at least one hearing aid compatible coil of an apparatus is active;

providing for display of a visual indicator at a location on a display of the apparatus corresponding to the at least one hearing aid compatible coil based on a position of at least one hearing aid compatible coil in response to the hearing aid compatible coil being active;

determining an orientation of the apparatus;

providing for display of one or more visual elements, wherein a location and rotation of the one or more visual elements is determined based on the orientation of the apparatus;

wherein the location of the visual indicator corresponding to the at least one hearing aid compatible coil is maintained regardless of orientation of the apparatus;

monitoring a location of a hearing aid of a user relative to the at least one hearing aid compatible coil while the hearing aid compatible coil is active;

providing at least one of audible or tactile feedback in response to the hearing aid moving from a first position having a first quality of coupling between the hearing aid and the at least one hearing aid compatible coil to a second position having a second quality of coupling between the hearing aid and the at least one hearing aid compatible coil, wherein the second quality is relatively worse than the first quality;

determining whether a direction of relative movement, indicated by the at least one of an audible or tactile feedback, between the hearing aid compatible coil and the hearing aid improves a quality of coupling between the hearing aid and the at least one hearing aid compatible coil; and continuing to monitor the location of the hearing aid of the user relative to the at least one hearing aid compatible coil regardless of the direction of relative movement that is determined.

15. The computer program product of claim 14, wherein the visual indicator comprises at least one visual indicator element, wherein the visual indicator element rotates about the location on the display corresponding to the at least one hearing aid compatible coil, based on the orientation of the apparatus.

16. The computer program product of claim 14, further comprising:

program code instructions for providing for a tactile indication presented at the location corresponding to the at least one hearing aid compatible coil.

* * * * *